(No Model.)

C. WEIGAND.
TROTTING SULKY.

No. 516,250. Patented Mar. 13, 1894.

Witnesses.
E. B. Gilchrist

Inventor.
Charlie Weigand
By Leggett & Leggett
his Attorneys.

THE NATIONAL LITHOGRAPHING COMPANY,
WASHINGTON, D. C.

UNITED STATES PATENT OFFICE.

CHARLIE WEIGAND, OF CLEVELAND, OHIO.

TROTTING-SULKY.

SPECIFICATION forming part of Letters Patent No. 516,250, dated March 13, 1894.

Application filed October 9, 1893. Serial No. 487,646. (No model.)

*To all whom it may concern:*

Be it known that I, CHARLIE WEIGAND, of Cleveland, in the county of Cuyahoga and State of Ohio, have invented certain new and useful Improvements in Trotting-Sulkies; and I do hereby declare the following to be a full, clear, and exact description of the invention, such as will enable others skilled in the art to which it pertains to make and use the same.

My invention relates to improvements in track or trotting-sulkies; and it consists in certain features of construction and in combinations of parts hereinafter described and pointed out in the claims.

Figure 1:
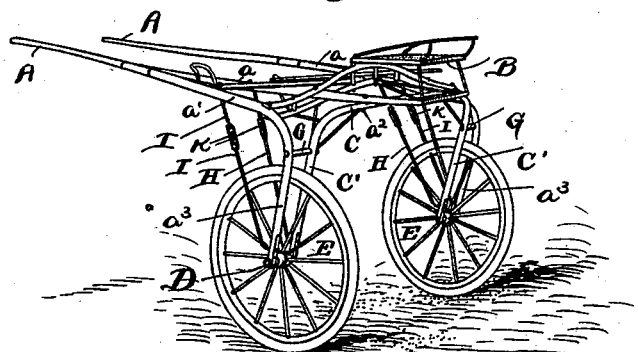
Figures 2, 3, 4:
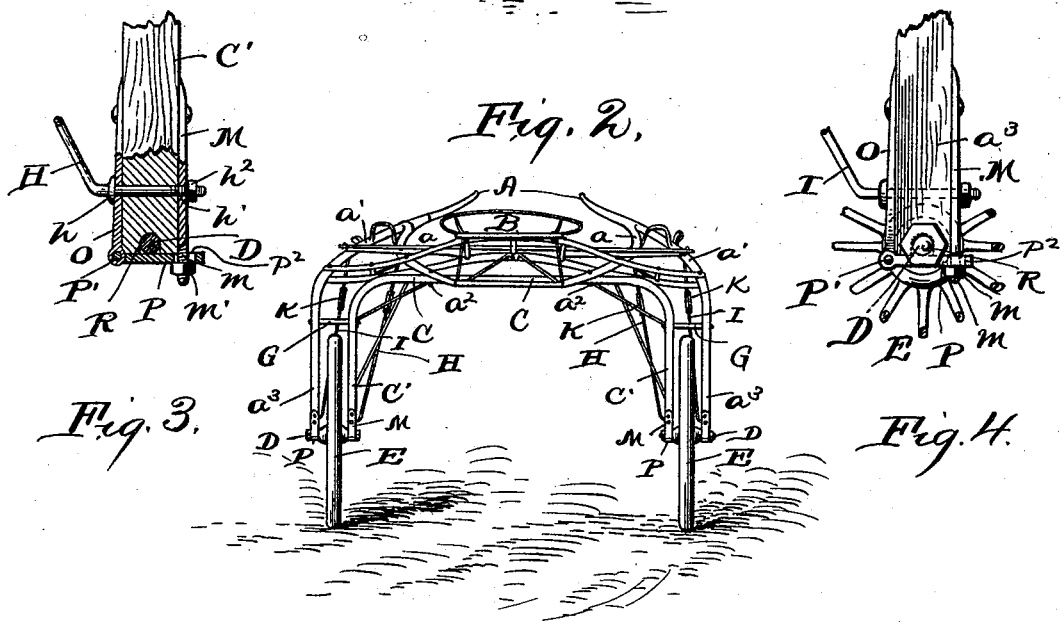

In the accompanying drawings, Figure 1 is a perspective of a sulky embodying my invention. Fig. 2 is a rear side elevation of the same. Figs. 3, 4 and 5 are details hereinafter described, the former being partly in section.

Referring to the drawings, A A represent the shafts of my improved vehicle. Said shafts, at or near their central portion, terminate in two rearwardly diverging branches $a$ $a'$, respectively, one of said diverging members $a$ being preferably integral with, and the other diverging-member $a'$ being spliced or suitably secured to the forward portion of the respective shaft. Said diverging-members of the shafts are suitably tied and braced together and support seat B of the vehicle. The seat is also supported from an inverted U-shaped bar or yoke, C, that is arranged transversely of the vehicle, preferably below the central portion of the seat, and has the inwardly-extending branches $a$ of the shafts suitably secured thereto at $a^2$. Said U-shaped bar or yoke is arranged with the end-members C' thereof almost perpendicular, and, at its outer extremities, is suitably connected with the inner ends of stub-axles D upon which the wheels E of the vehicle are mounted. The outer branches $a'$ of the shafts of the vehicle connect with the outer ends of said axles, said outer branches of the shafts being bent downwardly, as at $a^3$, adjacent to and preferably parallel with the end-members of the aforesaid yoke, the wheels of the vehicle being located between the end-members of the yoke and said downwardly-bent portions of the outer branches of the shafts, said members of the yoke and shafts being separated a suitable distance to accommodate the location and operation of the wheels, and being suitably braced apart, as at G.

The end-members C' of yoke C are suitably tied to branches $a$ of the shafts by means of brace-rods, H, a brace-rod H being preferably attached to each end-member of the yoke, at or near the outer extremity of said member, and thence extending forwardly and upwardly to branch $a$ of the adjacent shaft, where it is secured in any suitable manner. The attachment of brace-rods H to the end-members of yoke C, is preferably accomplished, as shown in Fig. 3, wherein the brace-rod extends through the respective end-member of the yoke, has a shoulder $h$ abutting the forward side of said member, is screw-threaded, as at $h'$, at the opposite or rear side of the yoke-member, and has a nut $h^2$ mounted on said screw-threaded portion and abutting the yoke.

The outer downwardly-bent branches $a'$ of the shafts of the vehicle are suitably braced by means of rods I that are preferably attached to the lower end of the downwardly-extending members $a^3$ of said branches and thence extend forwardly and upwardly to and connect with the horizontal or approximately horizontal portions of branches $a'$ of the shafts, the attachment of said brace-rods with members $a^3$ being substantially the same as the connection of brace-rod H with yoke C, each of rods I extending through and having a shoulder or collar I' abutting the forward side of member $a^3$ of the respective shaft, being screw-threaded at the rear side of said member $a^3$, and having a nut mounted upon said screw-threaded portion and abutting said member $a^3$.

Rods H and I are preferably made in two sections coupled together by means of turn-buckles, K, by means of which said rods may be shortened or lengthened to laterally adjust the axles upon which the wheels are mounted, members $a^3$ of branches $a'$ of the shafts and members C' of yoke C being sufficiently yielding to accommodate such adjustment.

Another feature of my invention consists in the manner of securing the stub-axles to the yoke and members $a^3$ of the outer branches of the shafts of the vehicle, the construction employed being very clearly shown in Figs. 3 and 4 that exhibit the lower or outer ends of said members of the vehicle, the outer ends of the yoke and the outer or lower ends of the downwardly-bent portion of branches a' of the shafts being substantially the same in construction. Said members of the vehicle, as shown in said figures, are grooved or recessed centrally of their outer extremities, as at R, for receiving the respective axle. Two metallic plates M and O are suitably secured to the forward and rear sides, respectively, of members $a^3$ and C'. A gate, P, is suitably hinged, as at P', to the lower end of one of said plates; viz., plate O, said gate being adapted to engage the under side of the axle and hold the same in engagement with the respective groove or recess R, any suitable device or means being provided for retaining said gate in its closed position. A preferable construction of locking said gate in its closed position is shown in Figs. 3 and 4, wherein the other plate, viz., plate M, at its lower end, is provided with a screw-threaded stud, $m$, and the gate is slotted or perforated, as at $P^2$, to close against the axle over said stud, and held in said closed position by means of a nut $m'$ mounted upon the stud against the outer or lower side of the gate.

What I claim is—

1. In a track or trotting-sulky, the combination of the wheels; stub-axles upon which the wheels are mounted; shafts; seat partially supported from the shafts, an inverted U-shaped bar or yoke arranged transversely of the vehicle, said yoke also supporting the seat and embracing, at its outer extremities, the inner ends of the aforesaid axles; the shafts, at or near their central portion, terminating, respectively, in two rearwardly-diverging branches, the inner branch being suitably secured to the aforesaid yoke and the outer branch being bent downwardly, substantially as indicated and embracing, at its outer or lower extremity, the outer end of the adjacent axle; the downwardly-bent branches of the shafts being suitably braced and the inner branches of the shafts and end-members of the yoke being suitably tied together or braced apart, substantially as set forth.

2. In a track or trotting sulky, the combination of the wheels; stub-axles upon which the wheels are mounted; shafts; seat partially supported from the shafts, and an inverted U-shaped bar or yoke arranged transversely of the vehicle, said yoke also supporting the seat and embracing, at its outer extremities, the inner ends of the aforesaid axles; the shafts, at or near their central portion, terminating, respectively, in two rearwardly-diverging branches, the inner branch being suitably secured to the aforesaid yoke and the outer branch being bent downwardly, substantially as indicated and embracing, at its outer or lower extremity the outer end of the adjacent axle, said downwardly-bent branches of the shafts being suitably braced and the inner branches of the shafts and end-members of the yokes being suitably tied together or braced apart, one of said branches being made in two sections coupled together by means of a turn-buckle, sustantially as and for the purpose set forth.

3. In a track or trotting sulky, the combination of the wheels; stub-axles upon which the wheels are mounted; shafts; seat partially supported from the shafts, an inverted U-shaped bar or yoke arranged transversely of the vehicle below the seat and also supporting the seat and having its end-members embracing the inner ends of the axles; the shafts, at or near their central portion, terminating in rearwardly-diverging branches secured the one directly to the aforesaid yoke, and the other being bent downwardly adjacent the yoke and embracing, at its outer or lower extremity, the outer end of the adjacent axle; brace-rods for bracing said downwardly-bent branches of the shafts; brace-rods tying together or bracing apart the end-members of the aforesaid yoke and inner branches of the shafts, all of said rods being composed of two sections coupled together by means of turnbuckles, substantially as and for the purpose set forth.

In testimony whereof I sign this specification, in the presence of two witnesses, this 25th day of September, 1893.

CHARLIE WEIGAND.

Witnesses:
C. H. DORER,
WARD HOOVER.